United States Patent
Heath et al.

(10) Patent No.: US 7,765,420 B2
(45) Date of Patent: Jul. 27, 2010

(54) SINGLE-WIRE SEQUENCING TECHNIQUE

(75) Inventors: Jeffrey Lynn Heath, Santa Barbara, CA (US); Robert Peter Jurgilewicz, Pepperell, MA (US)

(73) Assignee: Linear Technology Corporation, Milpitas, CA (US)

( * ) Notice: Subject to any disclaimer, the term of this patent is extended or adjusted under 35 U.S.C. 154(b) by 989 days.

(21) Appl. No.: 11/208,630

(22) Filed: Aug. 23, 2005

(65) Prior Publication Data

US 2007/0050655 A1    Mar. 1, 2007

(51) Int. Cl.
*G06F 1/26* (2006.01)
(52) U.S. Cl. ...................................... 713/330
(58) Field of Classification Search ................. 713/324, 713/330
See application file for complete search history.

(56) References Cited

U.S. PATENT DOCUMENTS

| | | | | |
|---|---|---|---|---|
| 5,237,322 A | * | 8/1993 | Heberle | 340/870.13 |
| 5,343,472 A | * | 8/1994 | Michihira et al. | 370/445 |
| 6,278,713 B1 | * | 8/2001 | Campbell et al. | 370/417 |
| 6,298,066 B1 | * | 10/2001 | Wettroth et al. | 370/449 |
| 6,473,857 B1 | * | 10/2002 | Panas et al. | 713/2 |
| 6,493,243 B1 | * | 12/2002 | Real | 363/17 |
| 6,788,036 B1 | * | 9/2004 | Milavec et al. | 323/272 |
| 7,080,273 B2 | * | 7/2006 | Brown et al. | 713/330 |
| 7,337,342 B1 | * | 2/2008 | O'Brien | 713/330 |
| 2004/0233917 A1 | * | 11/2004 | Rocas et al. | 370/395.62 |

* cited by examiner

*Primary Examiner*—Thomas Lee
*Assistant Examiner*—Eric Chang
(74) *Attorney, Agent, or Firm*—McDermott Will & Emery LLP

(57) ABSTRACT

Novel system and protocol for controlling a sequence of events. The sequencing system has a master circuit for providing sequencing information defining a sequence of events using a sequencing signal, and at least one slave circuit responsive to the sequencing signal for producing at least one event signal defining an event. The master and slave circuits are configured for providing a bidirectional transfer of the sequencing information via a single wire.

21 Claims, 5 Drawing Sheets

SINGLE-WIRE SEQUENCING TECHNIQUE

TECHNICAL FIELD

This disclosure relates to sequencers, and more particularly, to circuitry and methodology for sequencing events that require different amounts of time to complete.

BACKGROUND ART

Sequencers are devices for automatically determining and controlling sequences of events, such as turning on or turning off power supplies. Many Application-Specific Integration Circuits (ASICs), microprocessors and other electronic circuits require multiple power supplies in order to operate. Often, these power supplies must be turned on and off in a specific order to avoid damage to an electronic circuit or to enable an electronic circuit to operate in a proper manner. Also, it may be desirable to initiate turning on one or several power supplies at a particular time slot and wait until these power supplies are on before turning on the next power supply or the next group of power supplies.

Often, the sequencing must involve multiple electronic circuits at different locations on an electronic assembly or at different electronic assemblies. Therefore, to perform sequencing, electrical communications between electronic circuits must be provided. One way to coordinate multiple electronic circuits involved in sequencing is to provide a central or master circuit that has multiple control outputs and status inputs for each sequenced event. Another solution might be to use a serial communication protocol, such as 12C, with an intelligent master controller. However, most communications protocols would not support highly accurate timing of events. Each of these approaches involves significant complexity in the system architecture and/or manufacturing process.

Therefore, there is a need for a new sequencing technique to provide sequencing of events among arbitrary number of electronic circuits using a single wire for transmitting sequencing information.

SUMMARY OF THE DISCLOSURE

The present disclosure offers a novel sequencing system and protocol. In accordance with one aspect of the disclosure, the sequencing system comprises a master circuit for providing sequencing information defining a sequence of events using a sequencing signal, and at least one slave circuit responsive to the sequencing signal for producing at least one event signal defining an event. The master and slave circuits are configured for providing a bidirectional transfer of the sequencing information via a single wire.

The sequencing information transferred from the master circuit to the slave circuit may define a required sequence of events, whereas the information transferred from the slave circuit to the master circuit indicates when the requested event is completed and enables the system to provide sequencing of events that require different amount of time to complete.

Each slave circuit may be provided on a separate chip and comprise a plurality of slave channels for producing respective event signals during time slots assigned to the slave channels. Multiple slave channels may produce the event signals during the same time slot. Alternatively, no slave channels may operate during some of the time slots. The slave channel may monitor an event initiated during the assigned time slot to indicate to the master circuit that the event occurs.

In accordance with an embodiment of the disclosure, the slave circuit may comprise a counter common for the plurality of the slave channels and responsive to the sequencing signal for producing a count representing a time slot. Each slave channel may comprise a comparator for comparing the count with a predetermined value assigned to a particular slave channel to produce an event signal if the count corresponds to the predetermined value. The counter may be incremented or decremented in accordance with an external signal to represent multiple time slots for carrying out a required sequence of events. The master circuit may produce multiple sequencing signals defining a predetermined number of time slots in a particular sequence of events.

In accordance with another aspect of the disclosure, a sequencing protocol may involve producing multiple sequencing signals for defining multiple time slots for carrying out a sequence of events, and producing multiple event signals defining respective events during a particular time slot.

In accordance with a further aspect of the disclosure, the sequencer is provided for controlling multiple power supplies in a power supply system. The sequencing procedure may be performed in two directions depending on a command from a system controller. For example, in one direction, multiple power supplies may be turned on in a predetermined order, and in the other direction, the power supplies may be turned off in the opposite order.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made with the example of a power supply system having multiple power supplies required to be turned on or off in a particular sequence. It will become apparent, however, that the concepts described herein are applicable to any system that requires sequencing of any types of events.

Figure 1:
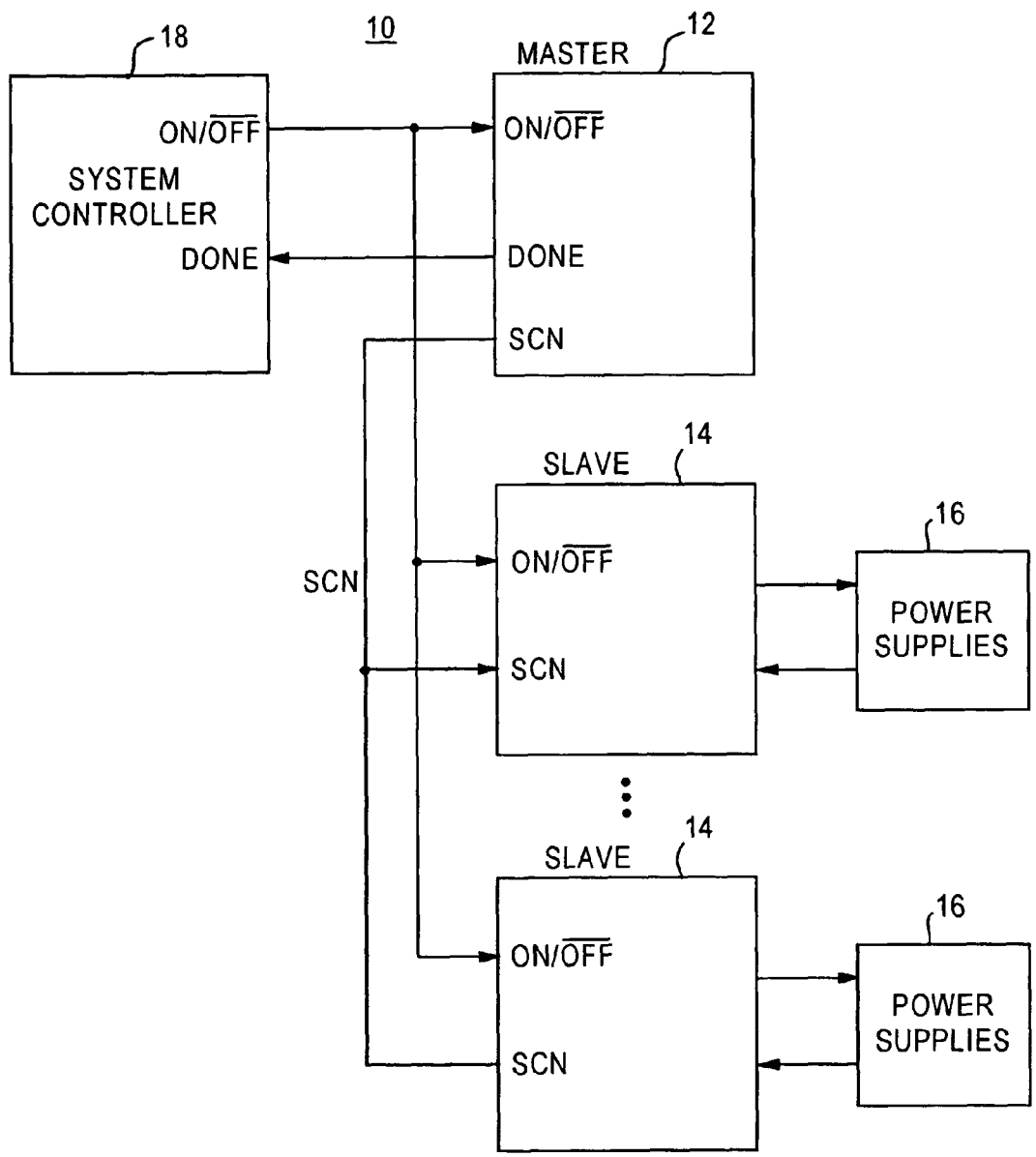
FIG. 1 is a block-diagram of a sequencing system of the present disclosure.

FIG. 1 shows a sequencing system 10 of the present disclosure that comprises a master sequenced event controller (SEC) 12 and slave SECs 14, each of which is provided for controlling and monitoring one or more events. Although the diagram in FIG. 1 shows multiple slave SECs 14, one skilled in the art would realize that only a single slave SEC 14 may be provided. For example, each slave SEC 14 may control and monitor a group of power supplies 16 coupled to the respective slave SEC 14. Master SEC 12 and the slave SECs 14 are connected with each other via a single-wire sequence control net (SCN) line that transfers SCN signals. As explained in more detail below, the SCN line provides a bi-directional transfer of sequencing information between the master SEC 12 and slave SECs 14. This transfer provides sequencing of events that require different time to complete.

The master SEC 12 may interact with a system controller 18 that supplies an on/off signal to the master SEC 12 and each of the slave SECs 14 to conduct the sequencing procedure in two directions. For example, the on-state of the on/off signal may result in turning on multiple power supplies in a predetermined order, and the off-state may initiate turning off the power supplies in the opposite order. The on/off signal may be a signal in which the on-state is inversed with respect to the off-state. For example, a high level of the on/off signal may correspond to the on-state and a low level of the same signal may correspond to the off-state. The master SEC 12 may supply the system controller 18 with a DONE signal, when the sequencing procedure is complete.

Each slave SEC 14 may be arranged on a separate chip to control the respective group of power supplies 16 associated with this chip. The master SEC 12 and at least one of the slave SECs 14 may be provided on the same chip. Alternatively, they may be arranged on separate chips.

Figure 2:
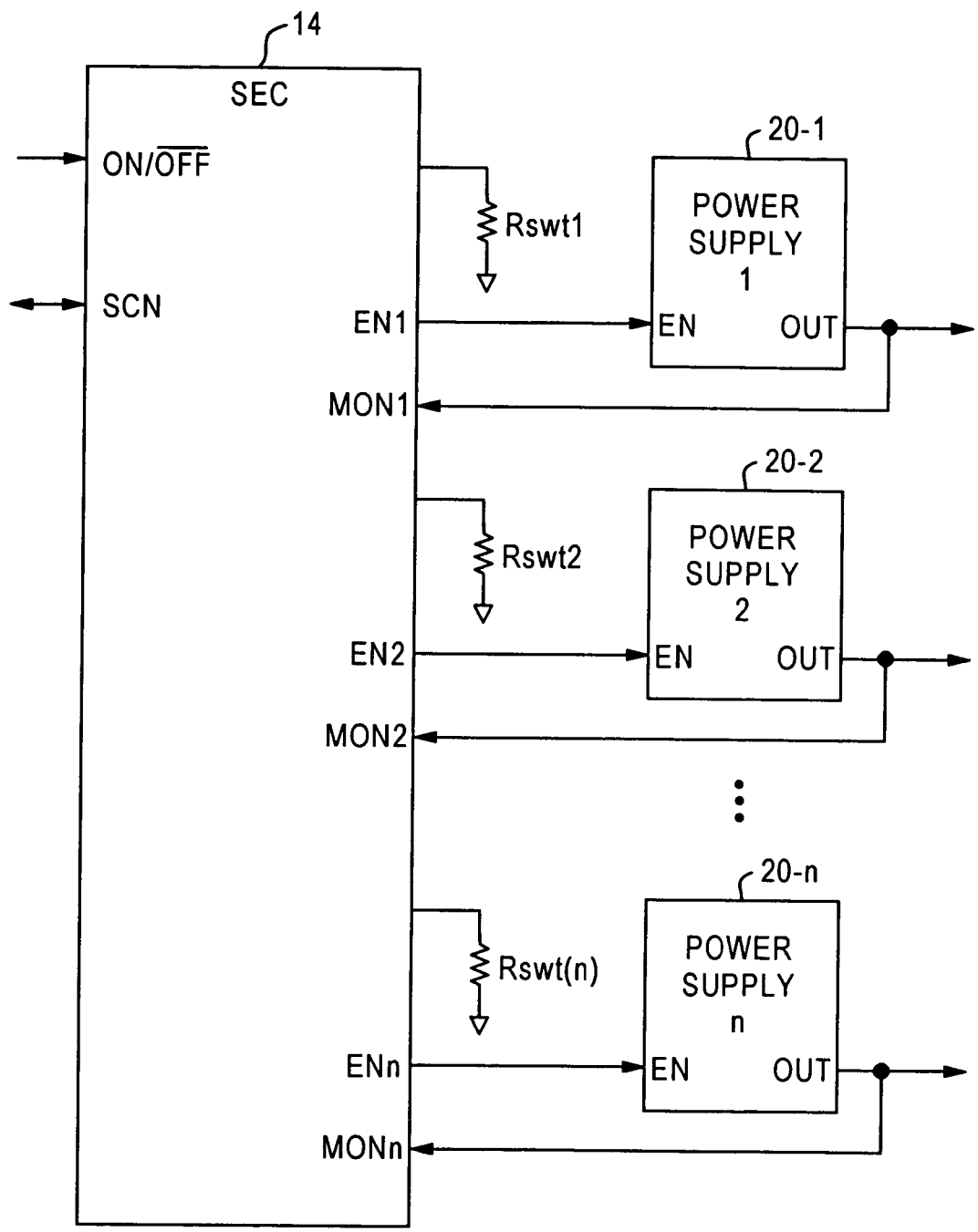
FIG. 2 is a diagram illustrating multiple channels in a slave sequenced event controller (SEC).

Referring to FIG. 2, each slave SEC 14 comprises multiple SEC slave (SCSS) channels 1 to n connected to respective power supplies 20-1 to 20-n for controlling and monitoring the power supply. Each slave channel transmits an enable signal EN to control the respective power supply 20, and receives a monitoring signal MON indicating a status or a monitored parameter of the respective power supply 20. In particular, as shown in FIG. 2, the slave channel 1 supplies a power supply 1 with an enable signal EN1 and receives a monitoring signal MON1 from the power supply 1. The slave channel 2 supplies a power supply 2 with an enable signal EN2 and receives a monitoring signal MON2 from the power supply 2. Finally, the slave channel n supplies a power supply n with an enable signal ENn and receives a monitoring signal MONn from this power supply.

Each slave channel is configured to turn on in a particular time slot. For example, an external configuration resistor Rswt may be provided for each slave channel to define a particular time slot. As shown in FIG. 2, a configuration resistor Rswt1 is provided to define a time slot for the slave channel 1, a configuration resistor Rswt2 is provided to define a time slot for the slave channel 2, and a configuration resistor Rswt(n) is arranged to define a time slot for the slave channel n. The configuration resistors Rswt for several slave channels may have the same value to turn on the respective slave channels in the same time slot.

Figure 3:
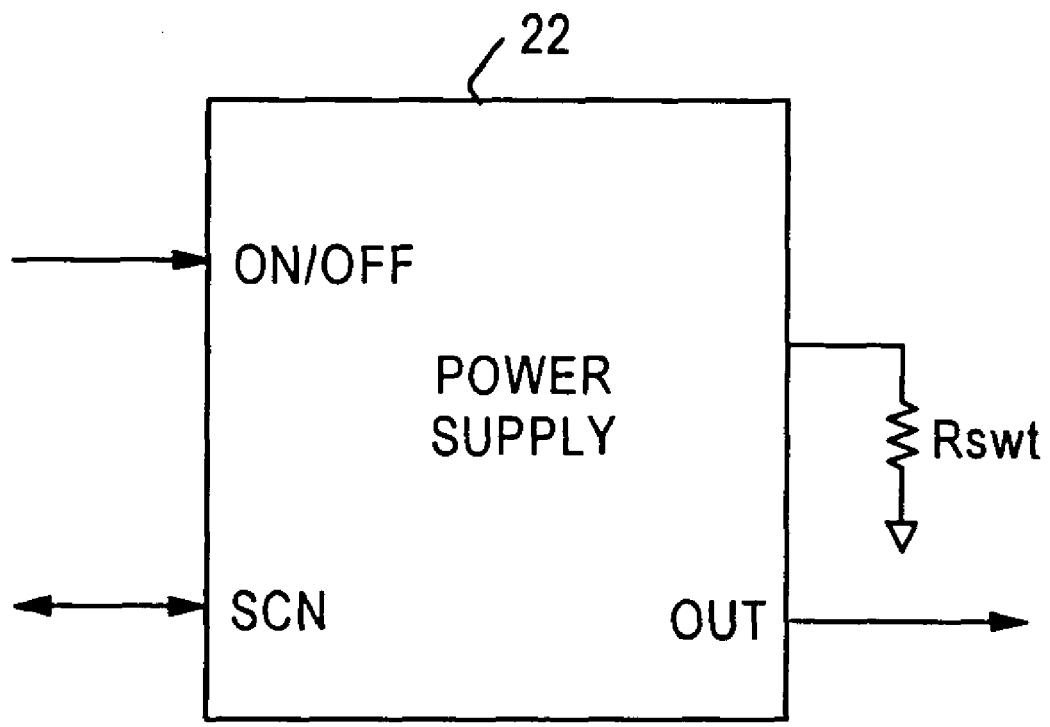
FIG. 3 is a diagram illustrating a power supply incorporating slave SEC circuitry.

Alternatively, as shown in FIG. 3, a power supply 22 may contain required circuitry for direct connection to the master SEC 12. In this case, the power supply 22 is directly connected to the master SEC 12 via a bi-directional single-wire SCN line that transfers SCN signals. Also, each power supply 22 may be directly supplied with the on/off signal from the system controller 18 to initiate turning on or off of the corresponding power supply 22. Each power supply 22 may have a respective external configuration resistor Rswt to define a particular time slot for controlling the corresponding power supply 22.

Figure 4:
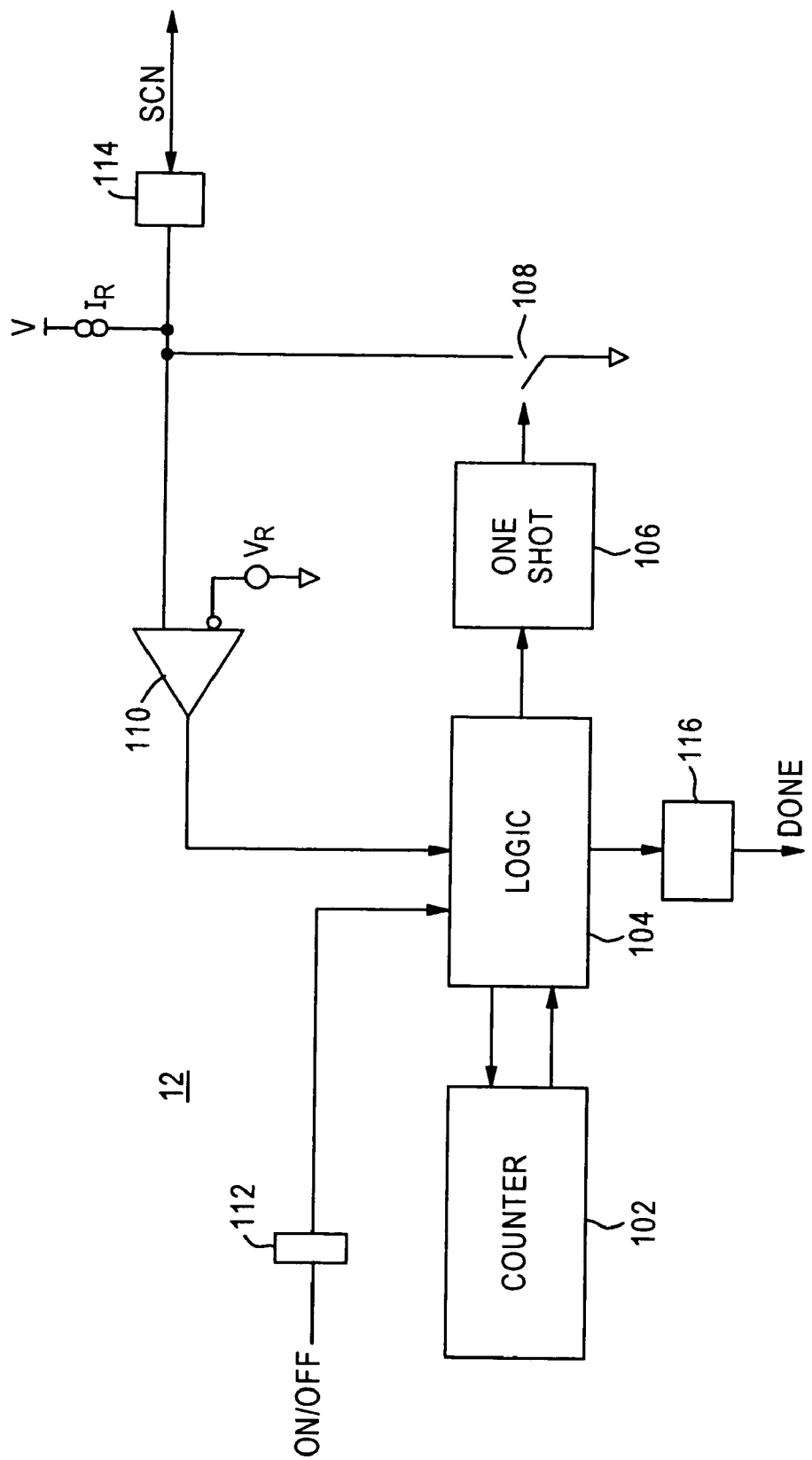
FIG. 4 is a diagram illustrating the structure of a master SEC.

Referring to FIG. 4, the master SEC 12 comprises a counter 102, a logic circuit 104, a one-shot circuit 106, a switching circuit 108, a comparator 110, an on/off signal pad 112, an SCN pad 114 and a DONE signal pad 116. In response to the on/off signal, the logic circuit 104 fires the one-shot circuit 106 producing a signal that turns on the switching circuit 108. As a result, the signal SCN normally pulled high by a current source $I_R$ is pulled low. When the signal SCN goes low, it defines the beginning of a time slot of a sequencing procedure. As described in more detail below, the signal SCN is pulled low until the slave SECs 14 carry out control operations scheduled during a particular time slot. When the slave SECs 14 release the SCN line indicating that control operations scheduled during the current time slot are completed, the SCN signal goes high.

The comparator 110 compares the SCN signal with a preset reference level $V_R$ and produces an output signal supplied to the logic circuit 104 when the SCN signal reaches the reference level. In response, after a predetermined delay, the logic circuit 104 fires the one-shot circuit 106 to initiate the next time slot. The counter 102 defines a predetermined number of time slots in a sequencing procedure. It counts the number of produced time slots and provides the logic circuit 104 with a signal terminating the sequencing procedure when the predetermined number of time slots is produced. In response to this signal, the logic circuit 104 issues the signal DONE supplied to the system controller 18 to report that the requested sequencing procedure is completed.

Figure 5:
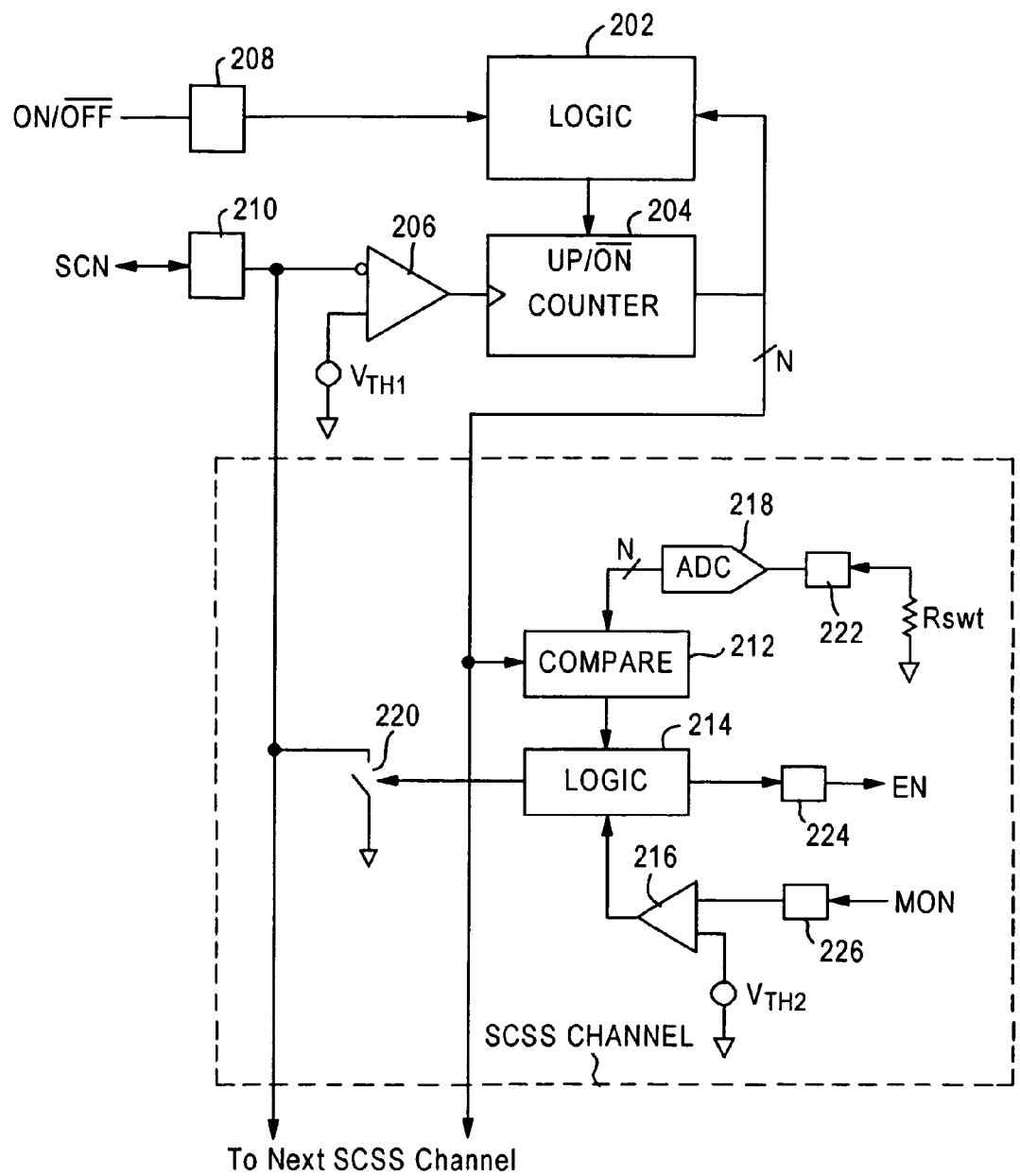
FIG. 5 is a diagram illustrating the structure of the slave SEC.

Referring to FIG. 5, each slave SEC 14 may comprise multiple SCSS channels and circuitry common for the SCSS channels. The common circuitry includes a logic circuit 202, a counter 204, a comparator 206, an on/off signal pad 208 and an SCN pad 210. Each SCSS channel includes a comparator 212, a logic circuit 214, a comparator 216, an analog-to-digital converter (ADC) 218, a switching circuit 220, pads 222, 224 and 226, and a resistor Rswt.

The comparator 206 compares the SCN signal with a predetermined threshold voltage $V_{TH1}$ to increment or decrement the counter 204. In particular, when the SCN line is pulled down by the master slave 12, the SCN signal becomes lower than the threshold voltage $V_{TH1}$, and the comparator 206 produces a signal that increments or decrements the counter 204. The direction of the counter 204 is controlled by the logic circuit 202 supplied with the on/off signal from the system controller 18 to switch the counter 204 into an incrementing mode when the on/off signal is in an on-state, and to switch the counter 204 into a decrementing mode when the on/off signal is in an off-state.

In response to a low level of the SCN signal, the counter 204 is incremented or decremented to produce an N-digit count having a particular digital value. This count is supplied to the comparator 212 of each SCSS channel. The comparator 212 compares the N-digit count with an N-digit value produced by the ADC 218 based on an analog value defined by the resistor Rswt assigned to the SCSS channel. As discussed above, the value determined by the resistor Rswt defines a time slot, during which a particular SCSS channel is activated. When the count of the counter 204 coincides with the value determined by the resistor Rswt, the comparator 212 produces a signal that causes the logic circuit 214 to generate the enable signal EN supplied to the respective power supply 20.

Hence, each SCSS channel monitors the count of the counter 204 and produces the enable signal EN when the count corresponds to the time slot assigned to the respective SCSS channel. Simultaneously, the logic circuit 214 produces a control signal to turn-on the switching circuit 220 in order to keep the SCN signal at a low level.

The enable signal EN may be provided to the power supply 20 to turn it on or off. For example, when the on/off signal is in an on-state the enable signal EN may be produced to turn on the power supply 20, and when the on/off signal is in an off-state, the enable signal EN may be supplied to turn off the power supply 20.

After asserting the enable signal EN, the SCSS channel may monitor the power supply 20 to determine whether the requested operation is fulfilled. In particular, when the EN signal is provided to turn on the power supply 20, the comparator 216 compares the monitoring signal MON received from the power supply 20 with a predetermined threshold voltage $V_{TH2}$ corresponding to a required power level and produces an output signal supplied to the logic circuit 214 when the monitoring signal MON reaches the threshold voltage $V_{TH2}$. For example, the monitoring signal MON may correspond to output voltage produced by the power supply 20. Similarly, when the EN signal is provided to turn off the power supply 20, the comparator 216 supplies the logic circuit 214 with an output signal, when the monitoring signal MON becomes zero or less than a predetermined threshold voltage indicating that the power is removed.

In response to the output signal of the comparator 216, the logic circuit 214 produces a control signal to turn off the switching circuit 220. Multiple SCSS channels may operate in a given time slot. When the last SCSS channel operating in a particular time slot determines that power from the corresponding power supply 20 is supplied or removed, it turns off its switching circuit 220, releasing the SCN line and causing the SCN signal to go high. The predetermined threshold voltages may be selected depending on parameters of the power supply 20 controlled by a particular SCSS channel, and may differ for different SCSS channels.

As discussed above in connection with FIG. 4, when the SCN line is pulled high, the master SEC 12 after a predetermined delay initiates the next time slot of the sequencing procedure by pulling the SCN line low. During the next time slot, one or more SCSS channels assigned to that time slot produce the enable signal EN to turn on or off power from the respective power supplies 20. Alternatively, no SCSS channels may be assigned to a particular time slot. In this case, after a predetermined delay, the master SEC 12 initiates the next time slot. The sequencing procedure is continued until all time slots defined by the master SEC 12 are completed.

Hence, the sequencing system of the present disclosure is able to sequentially control multiple power supplies associated with various chips using a single-wire SCN line that provides bidirectional transfer of sequencing information between master and slave SECs. The sequencing information transferred from the master circuit to the slave circuit may define a required sequence of events, whereas the information transferred from the slave circuit to the master circuit indicates when the requested event is completed and enables the system to provide sequencing of events that require different amount of time to complete.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A sequencing system comprising:
    a master circuit for providing sequencing information defining a sequence of events using a sequencing signal, and
    at least one slave circuit responsive to the sequencing signal for producing at least one event signal defining an event,
    the master circuit and the slave circuit being configured for providing a bidirectional transfer of the sequencing information via a single wire,
    the slave circuit comprising a plurality of slave channels for producing respective event signals.

2. The sequencing system of claim 1, wherein the sequencing information transferred from the slave circuit to the master circuit indicates when a requested event is completed to provide sequencing of events that require different amount of time to complete.

3. The system of claim 1, wherein each slave channel is configured for producing the event signal during a time slot assigned to that slave channel.

4. The system of claim 1, wherein multiple slave channels are configured to produce the event signals during the same time slot.

5. The system of claim 1, wherein a slave channel is configured for monitoring an event initiated during the assigned time slot to indicate to the master circuit that the event occurs.

6. The system of claim 1, wherein a slave channel is configured for controlling a power supply.

7. The system of claim 6, wherein the slave channel is configured to monitor the power supply to indicate to the master circuit that the power supply is powered on.

8. The system of claim 1, further comprising multiple slave circuits provided on separate chips.

9. The system of claim 1, wherein the slave circuit comprises a counter common for the plurality of the slave channels and responsive to the sequencing signal for producing a count representing a time slot.

10. The system of claim 9, wherein a slave channel comprises a comparator for comparing the count with a predetermined value to produce an event signal if the count corresponds to the predetermined value.

11. The system of claim 9, wherein the slave circuit is configured for incrementing or decrementing the counter in accordance with an external control signal.

12. The system of claim 1, wherein the master circuit is configured for producing multiple sequencing signals defining a predetermined number of time slots.

13. A method of controlling a sequence of events, comprising the steps of:
    producing multiple sequencing signals for defining multiple time slots for carrying out a sequence of events, and
    producing multiple event signals defining respective events during a time slot of the multiple timing slots, the sequencing signals being transferred from a master device to multiple slave devices via a single wire.

14. The method of claim 13, wherein an event signal is produced when a value represented by a sequencing signal corresponds to a pre-set value.

15. The method of claim 13, further comprising the step of monitoring an event caused by an event signal to indicate when the event occurs.

16. The method of claim 13, wherein the event signals are produced for controlling power supplies.

17. The method of claim 16, wherein a first event signal turns on or off a first power supply, and a second event signal turns on or off a second power supply.

18. A power supply system, comprising:
   at least one slave control circuit for controlling multiple power supplies, and
   a master control circuit for controlling the slave control circuit via a single wire so as to provide sequential control of the power supplies,
   plural power supplies being controlled during a time slot of multiple time slots defined by the master control device.

19. The system of claim 18, wherein the slave control circuit is configured to provide a sequencing procedure in two directions.

20. The system of claim 19, wherein the slave control circuit is configured to turn on the power supplies in a first predetermined order when the sequencing procedure is conducted in a first direction.

21. The system of claim 20, wherein the slave control circuit is configured to turn off the power supplies in a second predetermined order when the sequencing procedure is conducted in a second direction.

* * * * *